July 1, 1930.  S. WILTSE  1,769,007
PUMP MECHANISM
Filed Aug. 27, 1927

Inventor
Sumner Wiltse
By Irving Harness
Attorney

Patented July 1, 1930

1,769,007

UNITED STATES PATENT OFFICE

SUMNER WILTSE, OF DETROIT, MICHIGAN, ASSIGNOR TO WILTSE APPLIANCE CO., A CORPORATION OF MICHIGAN

PUMP MECHANISM

Application filed August 27, 1927. Serial No. 215,838.

This invention relates to fuel pumps for internal combustion engines, the principal object being the provision of a simple and efficient pump mechanism easily applied and economical to manufacture.

Another object is to provide a fuel pump for internal combustion engines in which the flow of lubricating oil is employed for driving the fuel pump.

Another object is to provide a fuel pump for internal combustion engines which is driven by the flow of lubricating oil and arranged to provide an oil pressure relief valve for the lubrication system.

Another object is to provide a fuel supply system for internal combustion engines so connected to the oiling system thereof that when level of the oil becomes low enough to endanger the proper lubrication of the engine bearings the supply of the fuel will be shut off, and operation of the engine will be prevented until sufficient oil has been added to eliminate the danger, thereby providing a safety device for the engine.

A further object is to provide a fuel pump for internal combustion engines comprising a pump element and a motor element connected together for simultaneous movement, the pump element being provided with suitable fuel inlet and outlet connections and with a means for regulating the pressure of the fuel delivered thereby, the motor element being positioned in a passage leading from the oil pump of the engine to the oil sump whereby to be driven by the same, the motor element serving as a pressure relief valve for the lubrication system of the engine.

The above being among the objects of the present invention, the same consists in certain features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views,—

Figure 1:
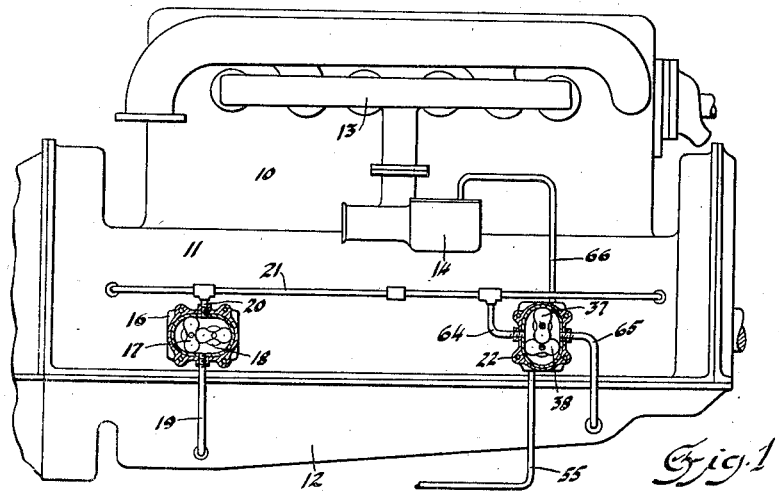
Fig. 1 is a side elevation of an internal combustion engine showing a lubrication pump and a fuel pump mounted thereon, the covers of said pumps being removed to illustrate the position of the pump elements therein and showing the passages for the flow of oil and fuel in connection therewith.

In accordance with the present invention I provide a fuel pump for internal combustion engines formed to be driven by oil from the engine lubrication pump and further formed to perform the dual function of a fuel pump and oil pressure relief means as well as a safety device for preventing burning out of the engine bearings due to lack of oil.

In accordance with the present invention I show in the accompanying drawing an internal combustion engine having a cylinder block 10, crank case upper half 11 and oil pan 12, the interior of which provides a sump for the lubrication system of the engine. Secured to the cylinder block 10 is an intake manifold 13 which may be of any conventional design, and secured to the manifold 13 is a carbureter 14 of any conventional design. The engine is provided with an oil pump which may be of any conventional design, but for the purpose of illustration is shown as comprising the housing 16 enclosing a pair of co-acting rotors 17 which rotors are suitably connected for equal rotation by a pair of gears such as 18 and is driven by suitable means (not shown) from some moving part of the engine as, for instance, the cam shaft, crank shaft, or accessory drive shaft. The intake side of the oil pump is connected by the tube or pipe 19 to the engine sump within the interior of the oil pan 12. A short pipe 20 leads from the outlet side of the oil pump and it is suitably connected to the longitudinally extending distributor pipe 21 which delivers the oil to the various bearings of the engine. Inasmuch as in mechanically driven oil pumps employed in internal combustion engines the volume of oil increases in direct proportion with the speed of the engine, and inasmuch as such pumps must be designed to provide ample lubrication for the bearing surfaces at low speeds of the engine, a greater volume of oil is pumped over the greater range of speed of the engine than is necessary for the proper lubrication of the bearing surfaces, and some means must be provided for allowing this excess amount of oil to be returned to the sump without being conducted to the bearing surfaces. The present invention utilizes this excess volume of oil for driving the fuel pump which serves at the same time as a means for governing the maximum pressure which may be built up by the oil pump, and at the same time provides means whereby the fuel is initially heated before it is conducted to the carbureter.

Figure 2:
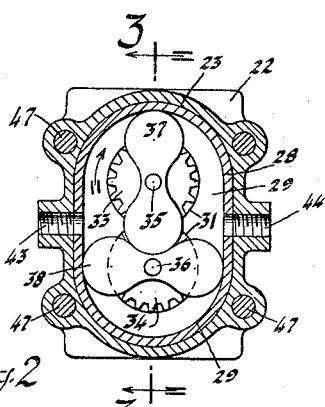
Fig. 2 is a sectional view of the fuel pump shown in Fig. 1 taken centrally through the oil inlet and outlet passages in a plane parallel to the sheet of drawing as viewed in Fig. 1.
Figure 4:
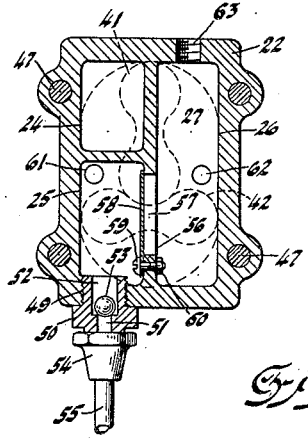
Fig. 4 is a sectional view taken on the line 4—4 of Fig. 3.
Figure 3:
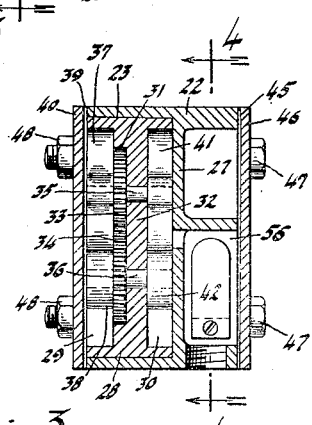
Fig. 3 is a sectional view taken on the line 3—3 of Fig. 2.

As best indicated in Figs. 2 to 4 inclusive, the fuel pump comprising the present invention comprises a housing 22 provided with an elliptically shaped recess 23 in one end thereof and three recesses 24, 25 and 26 in the other end thereof, a cross wall 27 dividing the recesses in one face from the recesses in the other face. Closely received in the recess 23 is a casing 28 provided with a recess 29 in the forward face thereof and a recess 30 in the rearward face thereof. The casing 28 is of the same depth as the depth of the recess 23 and is positioned therein with its rear face in contact with the cross wall 27 and its outer face flush with the outer face of the housing 22. The recess 29 opens onto a pair of circular sub-recesses 31 formed in the inner face thereof. A central wall 32 is provided between the recesses 29 and 31 and the recess 30. Rotatably received within the sub-recess 31 are a pair of gears 33 and 34 which extend into meshing relationship with each other. The gear 33 is provided with a shaft 35 which has suitable bearing in the wall 32 and the gear 34 is provided with a similar shaft 36 also bearing in the wall 32. The gears 33 and 34 are of a depth substantially equal to the sub-recesses 31 so that their outer faces are substantially flush with the bottom of the recess 29. Secured to the shafts 35 and 36 respectively within the recess 29 are the rotor elements 37 and 38 respectively. These rotor elements are of bi-lobed type such as are commonly used in the well known Root's blower. The gears 33 and 34 constrain the rotors 37 and 38 to rotate in a predetermined fixed relation with respect to each other. A gasket 39 and a cover 40 close the outer open end of the housing 22 and casing 28. Secured to the shafts 35 and 36 within the recess 30 are the rotors 41 and 42. A threaded opening 43 extending through the housing 22 and casing 28 connects the exterior of the housing 22 with the recess 29 and a similar threaded opening 44 connects the opposite side of the recess 29 with the exterior of the housing 22. A gasket 45 and cap 46 close the rear face of the housing 22. Bolts such as 47 extend through the cap 46, housing 22 and cap 40 and with the nuts 48 secure these parts in assembled relationship. The recess 25 is provided with an opening 49 in the lower side of the same, a connection member 50 being threaded into the opening. The connection member 50 is provided with a central opening 51 which merges in the enlarged opening 52 at the upper end thereof and a ball 53 is provided against the shoulder at the junction of the openings 51 and 52 in order to provide a check valve. A nut 54 serves to connect a pipe or tube 55 to the member 50. The wall 56 between the recesses 25 and 26 is provided with an enlarged opening 57 which is normally closed by the flat flexible member 58 secured over the same by means of a screw 59 and nut 60. An opening 61 in the wall 27 of the housing connects the recess 25 with one side of the recess 30 and a similar opening 62 connects the other side of the recess 30 with the recess 26. The upper wall of the recess 26 is provided with a threaded opening 63. As indicated in Fig. 1, a tube or pipe 64 connects the distributing pipe 21 with the intake opening 43 and another pipe 65 connects the outlet opening 44 with the engine sump. The pipe 55 extends to a fuel supply such as the conventional fuel tank of a motor vehicle, and a pipe 66 connects the opening 63 with the float bowl of the carbureter 14.

In operation the rotors are adapted to turn in the direction indicated by the arrow in Fig. 2. When the engine rotates oil is sucked through the pipe 19 from the engine sump, into the casing 16 by the rotors 17 and is forced into the pipe 20 and then into the distributor pipe 21. A part of the oil passing through the distributor pipe 21 is conducted through the pipe 64 into the recess 29 where the pressure of the same causes rotation of the rotors 37 and 38 in the direction indicated by the arrow in Fig. 2. When the rotors 37 and 38 are thus caused to rotate the rotors 41 and 42 are likewise caused to rotate inasmuch as they are secured to the corresponding shafts 35 and 36, and as the rotors 41 and 42 rotate a suction is created in the recess 30 which causes fuel to be drawn through the pipe 55 past the ball 53 and through the opening 61 and into the recess 30 and forced out of the recess 30 through the opening 62 into the recess 26 where it may pass out of the opening 63 into the pipe 66 and be delivered to the carbureter 14. Should the speed of the rotors 41 and 42 become great enough to deliver more fuel than the engine is using, the pressure of the same in the recess 26 will be built up, and acting against the flexible member 58 will cause the same to deflect and allow a portion of the fuel in the recess 26 to be passed back into the recess 25 where it will be recirculated. The flexible member 58 thus serves as a pressure relief valve for the fuel. As the amount of oil pumped by the oil pump increases in accordance with the increased speed of the engine it will be apparent that the resulting increased pressure of the oil will cause an equal increase in the speed of the rotors 37 and 38, and 41 and 42 and that as the speed of the rotors 41 and 42 increases the flexible member 58 will deflect to hold the pressure of the fuel in the recess 26 at a predetermined value. It will also be apparent that the resistance offered to building up a predetermined pressure of the fuel within the recess 26 will be of substantially constant value, and I utilize this resistance in the present invention to so control the speed of the rotors 37 and 38 as to allow sufficient oil to pass through the recess 29 to prevent the oil pressure in the distributor pipe 21 from exceeding a predetermined maximum value. In this manner the fuel pump serves as a pressure relief valve for the lubrication system of the engine, thus imparting a dual function to the same. At the same time it will be recognized that the oil passing through the housing 22 from the engine sump will, shortly after starting the motor when cold, become warm and a heat transfer will occur between the oil passing through the housing 22 and the fuel passing through the same, by conduction through the casing 28 and housing 22, thus heating the fuel that is discharged into the carbureter 14 and aiding in the vaporization of the same, thus aiding in the fuel economy of the engine itself.

An important feature of the construction thus described is that a safety device is provided for preventing the bearings of the engine from burning out due to a lack of lubricating oil. This feature is a result of the fact that the fuel pump is driven by the lubricating oil from the same pump that furnishes the engine bearings with lubricant. It will be apparent that in a case where the level of the lubricating oil in the engine becomes so low that the flow of oil to the engine bearings is stopped, or is intermittently pumped, the rotation of the fuel pump will be interrupted and the supply of fuel to the carbureter will be either interrupted or stopped completely, thus stopping rotation of the engine and preventing the same from being operated without lubrication, and eliminates any possibility of burned out bearings due to lack of lubricating oil.

A further feature of the present invention is the ample lubrication provided for the pump and its freedom from leakage of either oil or fuel. Inasmuch as the oil used for driving the pump is always under a greater pressure than the pressure of the fuel, the oil has a natural tendency to seep through the wall 32 from the recess 29 to the recess 30 around the shafts 35 and 36, thus lubricating the shaft bearings and sealing the oil system against the entrance of fuel. Furthermore, as no packed glands are employed anywhere in the pump, and as the housing 22 is completely closed by the caps 40 and 46, there is no possibility of wear of the parts causing leakage. This feature of sealing the fuel pump against leakage is the subject matter of my application for Letters Patent in the United States for improvements in fuel pump filed April 1, 1927, Serial No. 180,177.

While I have shown in the accompanying drawing a particular type of fuel pump and a particular means for driving the same from the oil system of the engine, it will be apparent that in the broad aspects of my invention, I do not limit the same to the specific construction disclosed, but that other suitable mechanism may be employed for performing substantially the same results as herein described. For instance, it will be apparent that although in the preferred embodiment of my invention the fuel pump is placed in an oil lead which discharges directly into the oil sump, it may, when desired, be placed in an oil lead which discharges onto some bearing surface for which lubrication is necessary, and the necessary changes to accomplish this as well as other obvious re-arrangements of parts to produce like changes are within the ability of the ordinary workman.

Formal changes may be made in the specific embodiment of the invention described without departing from the spirit or substance of the broad invention, the scope of which is commensurate with the appended claims.

What I claim is:

1. In combination with an internal combustion engine and the oiling system thereof, a passageway in said system for the flow of oil, a fluid operated motor element in said passageway driven by the flow of oil through the same, and a fuel pump operatively connected to said motor element and driven thereby, said motor element and said fuel pump having a common metallic housing whereby heat in said oil will be conducted to and be absorbed by the fuel in said pump.

2. A fuel pump comprising a housing provided with a pair of rotors, a pair of gears connecting said rotors for equal rotation, a second pair of rotors connected for equal rotation by said gears, means for introducing liquid under pressure to one of said pairs of rotors, a discharge opening for said liquid, a suction lead extending to the other of said pair of rotors, and a discharge lead from the last mentioned pair of rotors.

3. A fuel pump comprising a casing provided with opposed recesses separated by a wall between them, a pair of spaced shafts bearing in said wall and projecting into said recesses, a gear secured to each of said shafts, said gears meshing with each other, a rotor secured to each of said shafts in each on said recesses and held in predetermined relationship with respect to each other by said gears, means closing said recesses, a pressure inlet and an outlet opening for one of said recesses, and a suction inlet and an outlet for the other of said recesses.

4. A fuel pump comprising a housing provided with a recess, a casing received within said recess, said casing provided with a pair of recesses, a pair of rotors in each of the last mentioned recesses operatively connected together for interrelated movement, inlet and outlet openings for each of said last mentioned recesses, said inlet and outlet openings for one of said recesses each opening into a chamber, and a flexible diaphragm separating said chambers yieldable to by-pass liquid from the corresponding outlet opening to the corresponding inlet opening.

5. In combination with an internal combustion engine and the oiling system thereof, a fuel pump comprising a motor element and a pump element both of which are enclosed within a single housing, said motor element being driven by oil under pressure from said oiling system, said oil also lubricating the bearings of said pump and sealing said bearings against the leakage of fuel.

6. In combination with an internal combustion engine and the oiling system thereof, a fuel pump comprising a housing, a motor element and a pump element within said housing, a wall between said elements, means extending through said wall connecting said elements for simultaneous movement, means for introducing oil from said oiling system under pressure to said pump element for causing movement of the same, discharge means for said oil, and means for conducting fuel to and from said pump element, said oil also serving to lubricate the bearings of said pump and seal said pump against the leakage of fuel into said oil.

SUMNER WILTSE.